United States Patent [19]

Mitsuoka et al.

[11] 4,421,802
[45] Dec. 20, 1983

[54] AUTOMOTIVE DOOR SIDE MOLDING STRUCTURE

[75] Inventors: Toshihiro Mitsuoka; Shojiro Seki, both of Yokohama, Japan

[73] Assignee: Nissan Motor Company, Limited, Yokohama, Japan

[21] Appl. No.: 380,450

[22] Filed: May 20, 1982

[30] Foreign Application Priority Data

May 22, 1981 [JP] Japan .............................. 56-73237[U]

[51] Int. Cl.³ ............................................ B60R 13/04
[52] U.S. Cl. ...................................... 428/31; 293/126
[58] Field of Search .................. 428/31; 293/126, 128, 293/154

[56] References Cited

U.S. PATENT DOCUMENTS 4,015,760  4/1977  Bott .................................... 428/31 X
4,083,592  4/1978  Rubin et al. ...................... 428/31 X
4,334,706  6/1982  Seki ................................... 428/31 X Primary Examiner—Henry F. Epstein
Attorney, Agent, or Firm—Schwartz, Jeffery, Schwaab, Mack, Blumenthal & Koch

[57] ABSTRACT

In an automotive door side molding structure including a metallic molding base member provided along the waistline of a door panel, and end caps fitted thereover, the end caps are constructed to prevent the metallic molding base member from being struck by or disposed in direct contact with the door sash, thereby preventing formation of rust which might otherwise be caused, while at the same time providing a good appearance at the ends of the structure.

9 Claims, 12 Drawing Figures

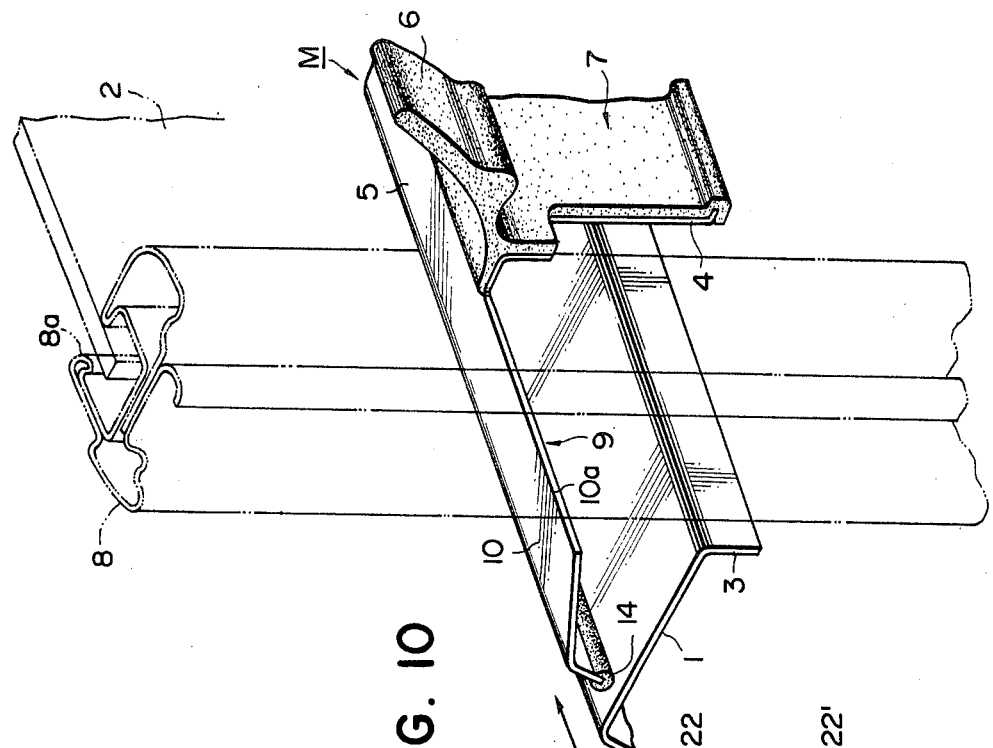
FIG. 10
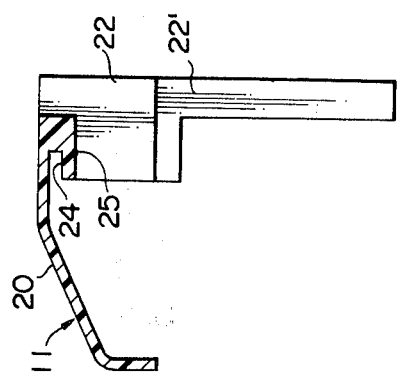
FIG. 11
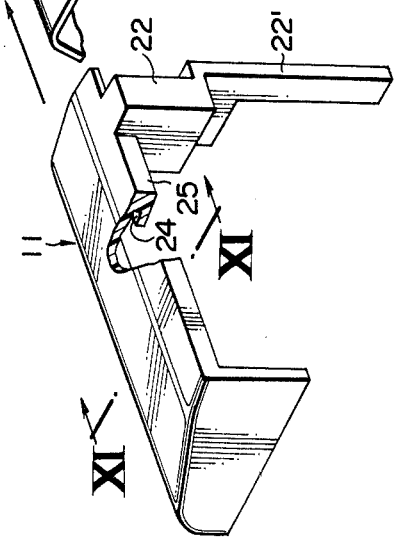

AUTOMOTIVE DOOR SIDE MOLDING STRUCTURE

BACKGROUND OF THE INVENTION

1. Field of the Invention

The present invention relates to an automotive door side molding structure which is provided along the waistline of the door panel of motor vehicle, and more particularly it pertains to improvements in or relating to such door side molding structure having end caps at the front and rear ends thereof.

2. Description of the Prior Art

In general, as shown in FIG. 1, at the waist opening of an automotive door D are mounted a door outer side molding M along the waistline of a door outer panel 1 and a door inner side molding (not shown) along the waistline of a door inner panel (not shown). The outer side molding M and inner side molding are so constructed as to improve the appearance of the waist of the door D while maintaining the seal between the waist opening and a door wind shield 2.

The conventional door side molding structure of this type will be explained in the following in more detail by taking the door outer side molding as an example. Referring to FIGS. 2 through 5, a door side molding body 7 is comprised of a metallic molding base 5 and a lip member 6 made of a resilient material such as rubber, for example, these components being formed integral as one part by double extrusion molding. The metallic base 5 covers from above the waist opening of the door outer panel 1 and has a flange 4 secured to a door outer panel flange 3 at the waist opening. The lip member 6 is attached to the flange 4 of the metal base 5 and extends along the length of the base 5 with the projected end of the lip 6 at the upper portion of the flange 4 placed in resilient contact with the door windowpane 2. At each of the front and rear ends of the molding body 7 on the inner side is formed a recess 9 to avoid interference with a door sash 8. End caps 11, each having a cross section as shown in FIG. 3, are placed over and bonded to the front and rear end portions 10 of the molding body 7 to cover the recesses 9 thereby providing a good appearance at the ends of the door outer side molding M. For the sake of simplicity, only one of the end caps 11 is shown in the drawings.

This kind of conventional door side molding structure, however, has drawbacks. That is, the end cap 11 covers the outer surface of the end portion 10 of the molding body 7 and only a part of the recess 9, so that the vertical edge of the recess 9 facing the inner end 8a of the door sash 8, as denoted by 12, is not covered by the end cap 11 but remains exposed. Hence, during the assembly of the door outer side molding M there is a possibility of the metallic base 5 at the vertical edge 12 of the recess 9 contacting the sash 8, which in turn will result in formation of rust. To prevent the interference between the door sash 8 and the vertical edge 12 of the recess 9, the front and rear ends of the door outer side molding M may be formed so as to provide a gap 13 between the sash 8 and the vertical edge 12. But too large a gap will impair the appearance of the end portion of the door outer side molding M. A rubber seal 14 is fitted to the lower side of the metal base 5 contacting the door outer panel 1 to prevent metallic contact between the base and the door outer panel. Reference numeral 15 denotes a door weather strip and 16 a windowpane rubber run.

SUMMARY OF THE INVENTION

Accordingly, it is an object of the present invention to eliminate the aforementioned drawbacks of the prior art.

Another the present invention is object of to provide an automotive door side molding structure including end caps each provided with a projection protruding toward the door windowpane to cover at least a part of the recessed vertical edges of the molding body which faces the inner end of door sash, thereby preventing interference between the recessed vertical edge of the door side molding and the door sash during the assembly process without impairing the appearance of the end portions of the door side molding.

BRIEF DESCRIPTION OF THE DRAWINGS

Other objects, features and advantages of the present invention will become apparent from the accompanying drawings.

FIG. 10 is a perspective view of a second embodiment of the door side molding structure according to this invention with the end cap disassembled;

FIG. 11 is a cross-sectional view of the end cap taken along the line XI—XI of FIG. 10.

DESCRIPTION OF THE PREFERRED EMBODIMENTS

Figure 1:
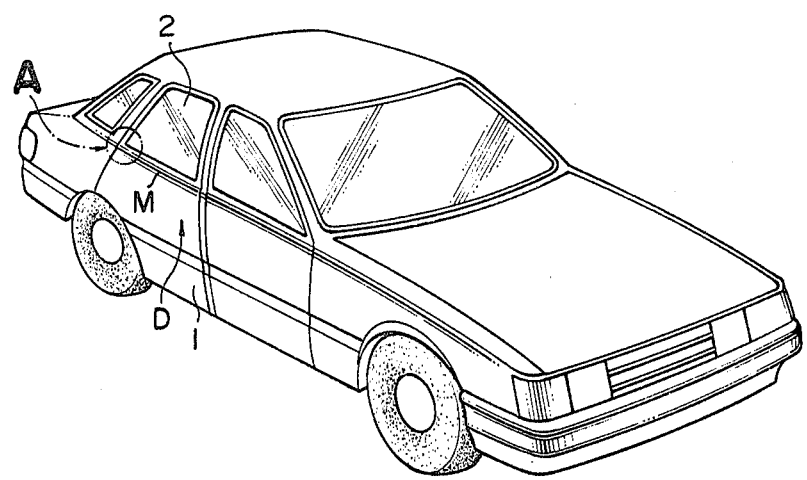
FIG. 1 is a perspective view of an automobile.
Figures 2, 3:
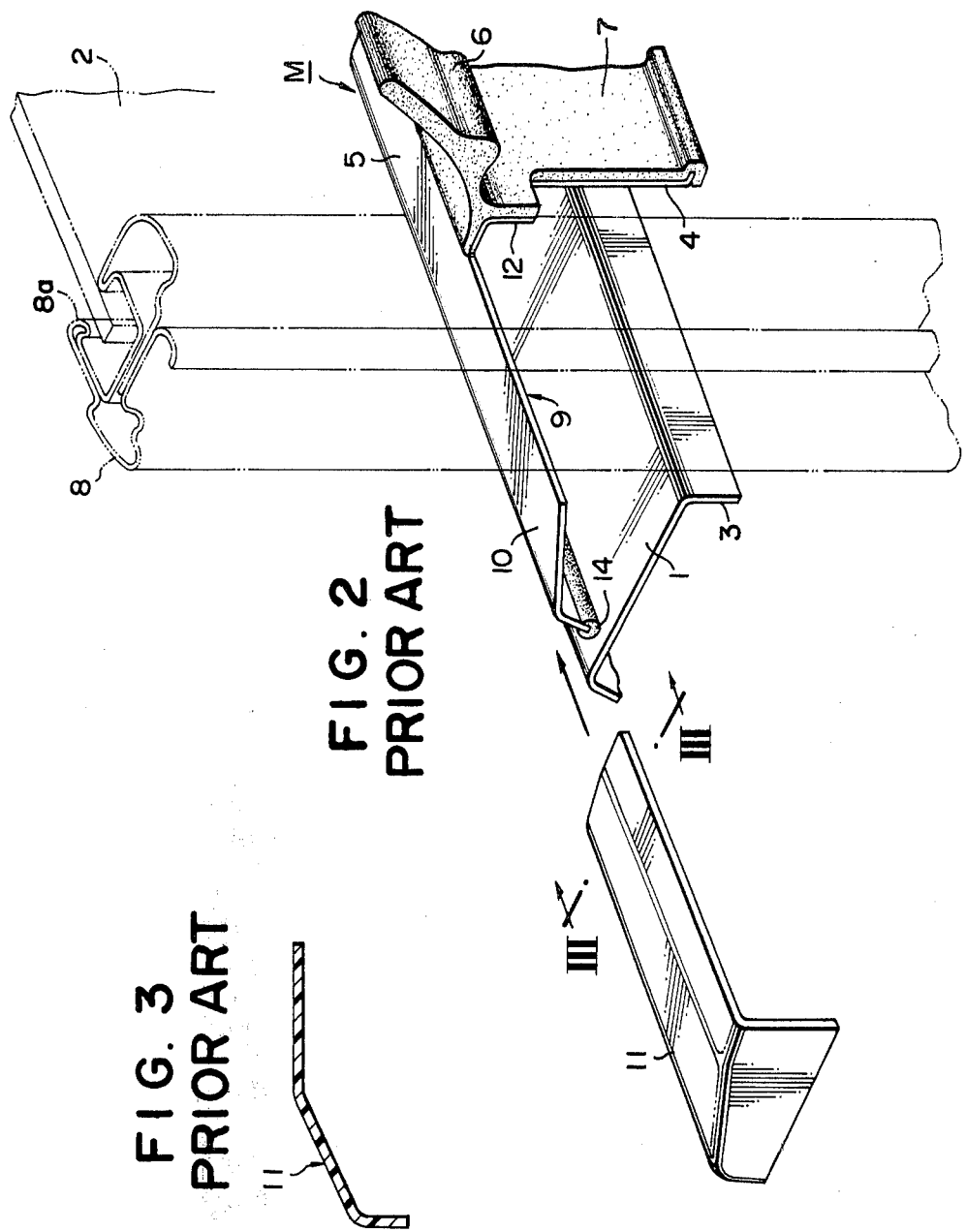
FIG. 2 is a partially enlarged perspective view of part A of FIG. 1, showing one example of the automotive door side molding structure.
FIG. 3 is a cross-sectional view of the end cap taken along the line III—III of FIG. 2.
Figure 4:
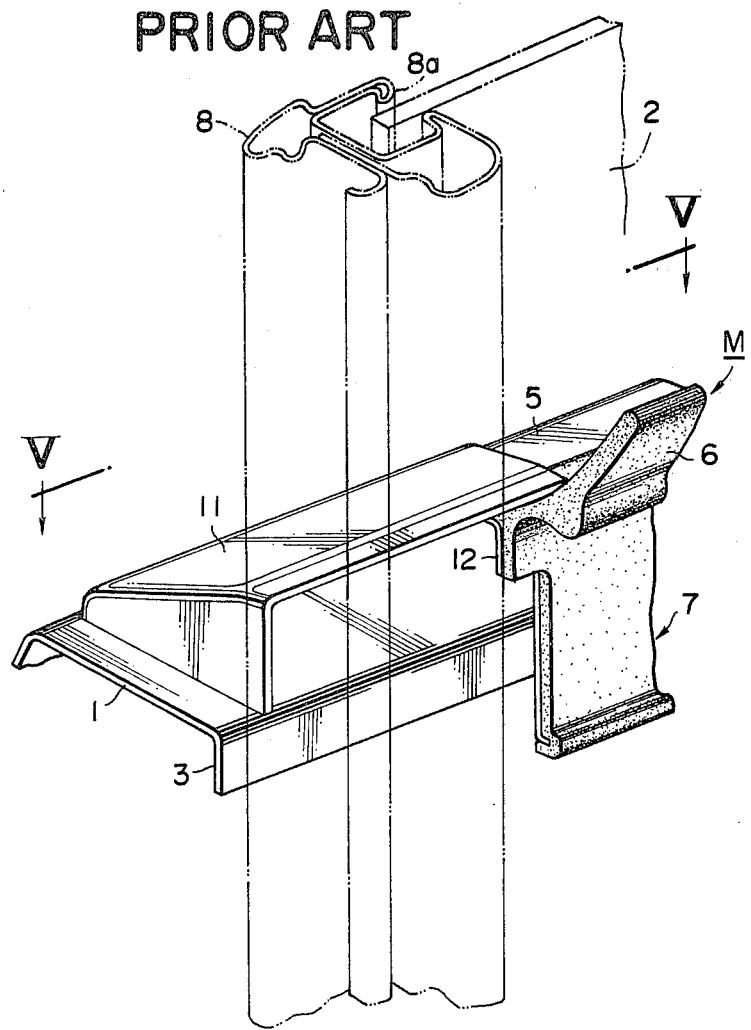
FIG. 4 is a perspective view of the door side molding structure as shown in FIG. 2 but with the end cap mounted in place.
Figure 5:
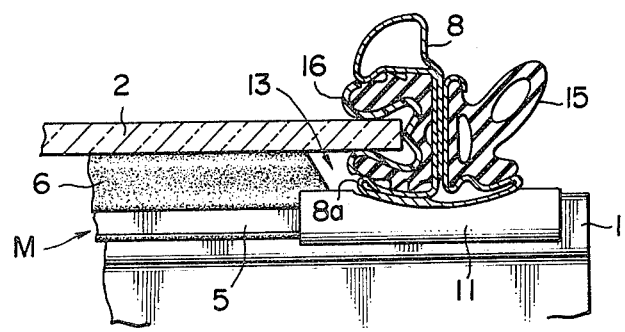
FIG. 5 is a cross-sectional plan view taken along the line V—V of FIG. 4.
Figure 6:
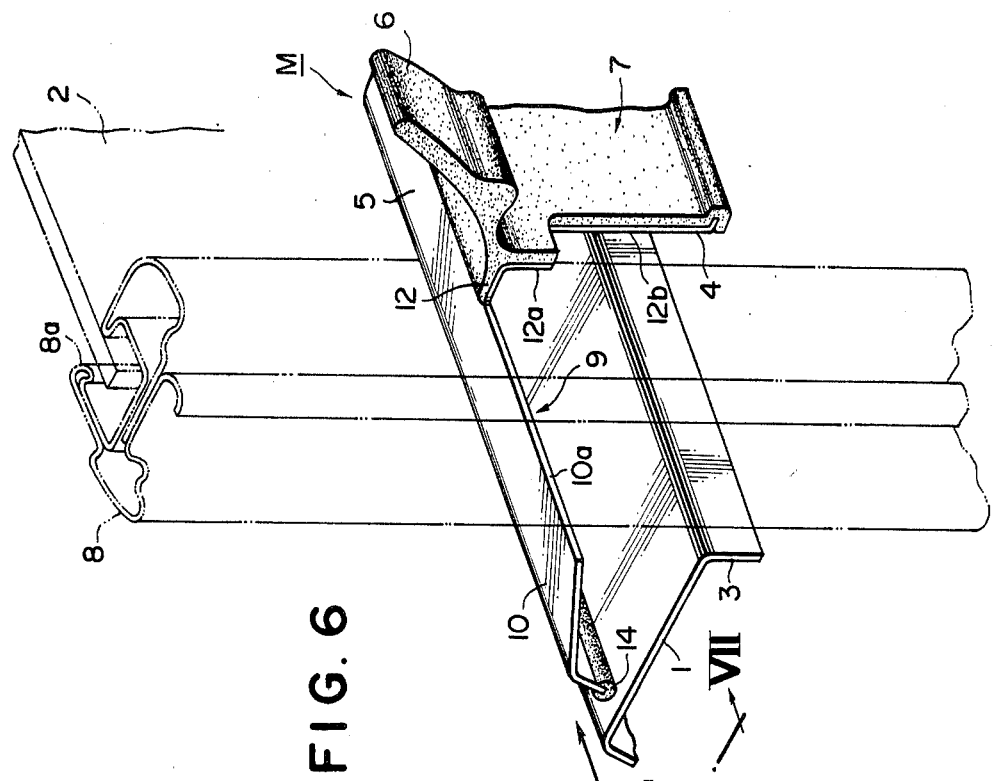
FIG. 6 is a perspective view of the door side molding structure embodying the present invention with the end cap disassembled.
Figure 7:
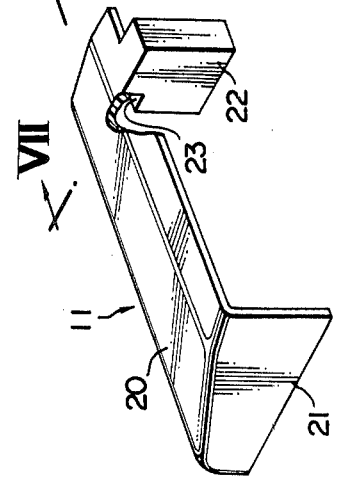
FIG. 7 is a cross-sectional view of the end cap taken along the line VII—VII of FIG. 6.
Figure 8:
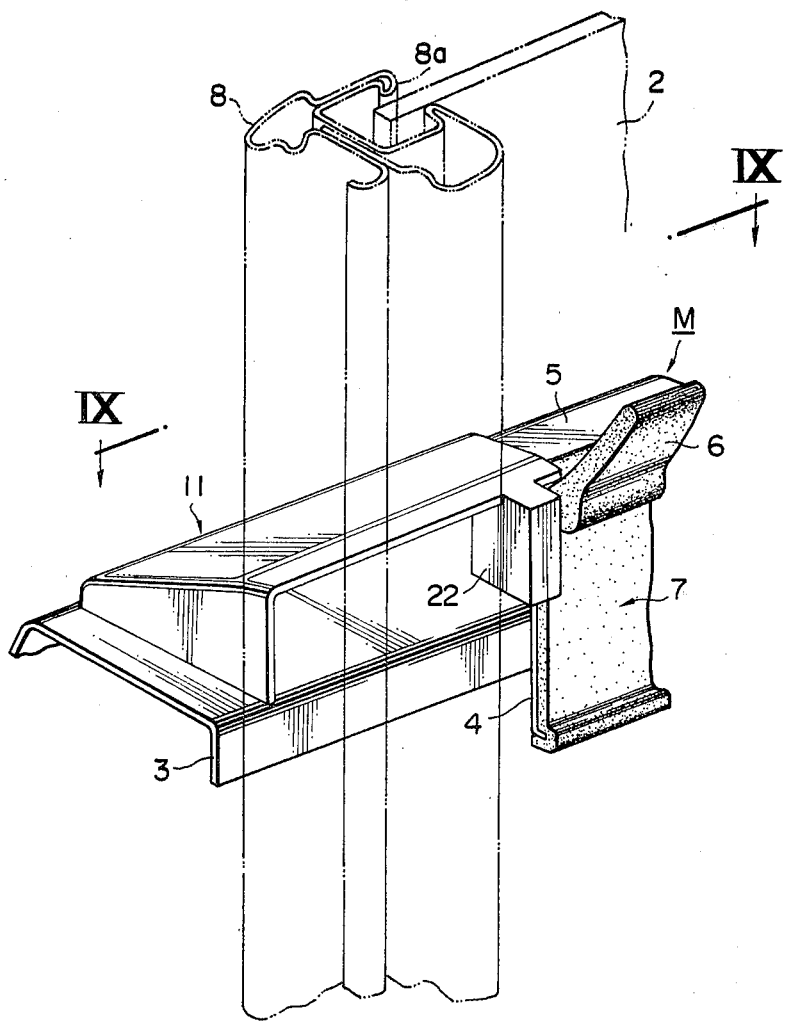
FIG. 8 is a perspective view of the door side molding structure as shown in FIG. 6 but with the end cap mounted in place.

This invention will now be explained in detail in conjunction with the preferred embodiments shown in the attached drawings.

A first embodiment of the present invention is shown in FIGS. 6 through 9, wherein the door outer side molding M basically consists, as with the conventional one, of a molding body 7 made up of a molding base 5 and a molding lip 6 and having a recess 9 cut at each end of the molding body on the inner side, and end caps 11 fitted over the front and rear end portions 10 of the molding body 7. For the sake of simplicity, only one of the end caps is shown in the drawings.

According to this embodiment, the recess 9 is cut generally in a rectangular shape at each end of the molding body 7 on the inner side to avoid interference with the door sash 8. The vertical edge 12 of the recess 9 facing the inner end 8a of door sash 8 is formed stepwise as shown at 12a and 12b with the upper portion 12a of the step placed adjacent to the inner end 8a of the door sash 8.

The end cap 11 formed of rubber or the like has a cover portion 20, shaped substantially in conformity to the end portion 10 of the molding body 7, and at one end a stopper portion 21 abutting against the edge of the end portion 10. On the side of the door windowpane 2 the end cap 11 has a protuberance 22 formed integral therewith protruding from the cover portion 20 and extending downward. At the boundary between the protuberance 22 and the cover portion 20 is formed a guide groove 23 in which the recessed edge 10a of the end portion 10 is received. The protuberance 22, when the end cap 11 is mounted in place, comes into contact with the upper step portion 12a of the recess 9. The end cap 11 is held secured to the end portion 10 of the molding body 7 by bonding agent.

Figure 9:
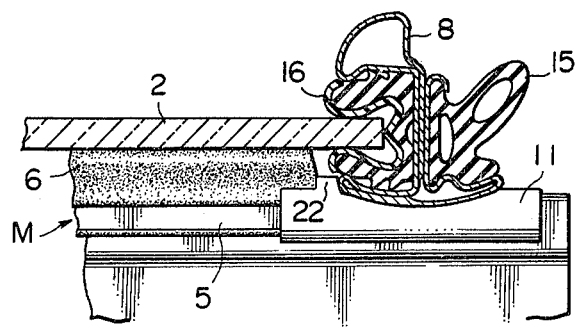
FIG. 9 is a cross-sectional plan view taken along the line IX—IX of FIG. 8.

Thus, with the door outer side molding structure according to this embodiment, in assembling the door outer side molding M already fitted with the end cap 11 onto the door outer panel 1, the flange 4 of the molding base 5 is spot-welded or otherwise secured to the waist opening flange 3 of the door outer panel 1. During assembly, the upper step portion 12a of the recess 9 of the molding body 7 can be kept from direct contact with the inner end 8a of the door sash 8 since the upper step portion 12a is covered or protected by the projection 22. This in turn prevents the formation of rust that might otherwise be caused by the metallic contact between the molding base 5 at the upper step portion 12a and the door sash 8. Moreover, since the protuberance 22 protrudes from the end cap 11 toward the door windowpane 2 as shown in FIG. 9, it serves to close a gap 13 between the upper step portion 12a and the inner end 8a of the door sash 8. The resultant reduction in the space of the gap 13 contributes to the improvement in appearance of the end portion of the door outer side molding M.

Figure 12:
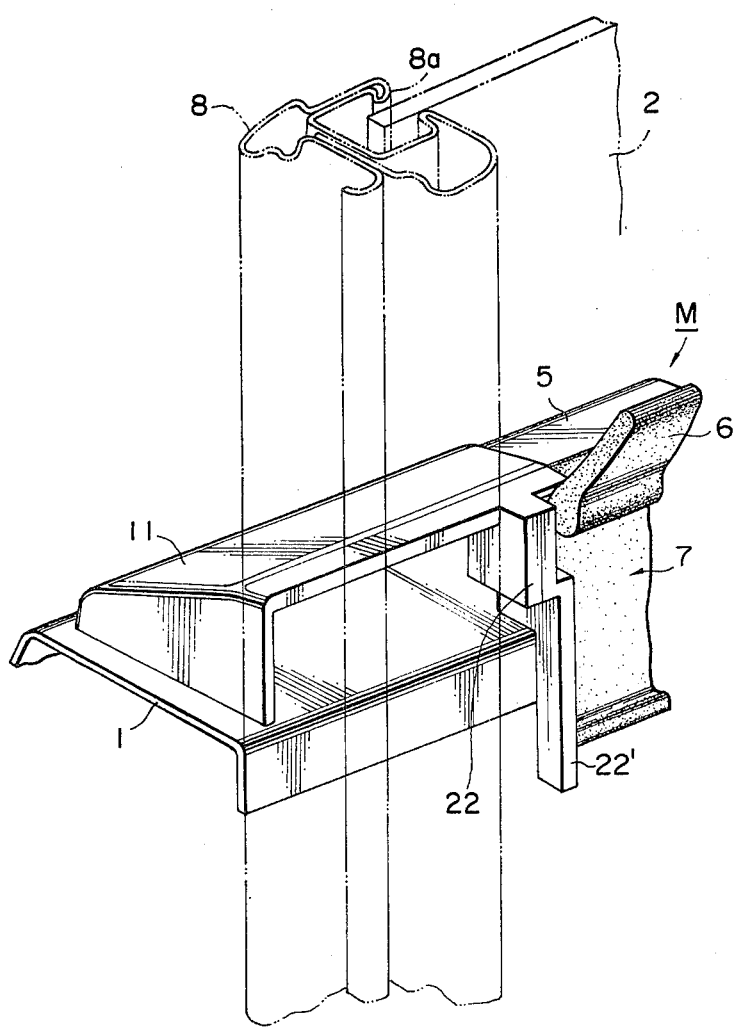
FIG. 12 is a perspective view of the door side molding structure as shown in FIG. 10 but with the end cap mounted in place.

Next a second embodiment of this invention will be described referring to FIGS. 10 through 12.

Unlike the first embodiment, the protuberance 22 of the end cap 11 of this embodiment is provided with a vertial extension 22' which provides, together with the protuberance 22, an engagement surface that comes into contact with the entire, stepped vertical edge 12 of the recess 9. The end cap 11 also has at the back of the cover portion 20 an engagement groove 24 into which the entire span of the recessed edge 10a of the molding body end portion 10 is fitted. Furthermore, the end cap 11 has an edge cover 25 formed integral therewith for concealing the recessed edge 10a of the end portion 10.

With this embodiment, therefore, the horizontal and vertical edges of the recess 9 are entirely covered by the protuberance 22, vertical extension 22' and edge cover 25 of the end cap 11 which is bonded to the molding body 7. As a result there is no part of the metal base 5 remaining exposed at the edge of the recess 9 and the possibility is completely precluded of direct contact between the metal base 5 and the door sash 8.

Although in the above embodiment the end cap 11 and the protuberance 22 are formed integral as one part, the projection may be formed separately and then attached to the end cap 11. It should also be noted that while the end cap 11 is formed separate from the molding body 7 in the above embodiments, this invention can also be applied to the case where the end cap 11 is formed integral with the molding body 7. Furthermore, while only the door outer side molding M has been described, this invention is also applicable to the door inner side molding.

As can be seen from the foregoing, with the automotive door side molding structure of the present invention, the protuberance protruding from each end cap toward the door wind shield covers at least a part of the vertical edge of the recess, thereby preventing the recessed vertical edge of the door side molding from being struck by or disposed in direct contact with the door sash and thus avoiding formation of rust due to their metallic contact. Moreover, since the protuberance of the end cap is placed in such a manner as to fill the gap between the recessed vertical edge of the door side molding and the door sash, the gap space can be made small as compared to that of the conventional structure thus improving the appearance of the end portion of the door side molding.

While the present invention has been illustrated and described in conjunction with specific embodiments thereof, it is to be understood that the present invention is by no means limited thereto but covers all changes and modifications which will become possible without departing from the spirit of the invention and the scope of the appended claims.

What is claimed is:

1. An automotive door side molding structure, comprising:
    a molding body including a metallic molding base member provided along the waistline of a door panel, and a molding lip member of a resilient material secured along the length of said molding base member and adapted to be disposed in resilient contact with a door windowpane in a door sash;
    said molding body being formed with a recessed portion at each of the front and rear end portions of said metallic molding base member thereof, each said recessed portion having a horizontal edge and vertical edge; and
    end caps adapted to be fitted over said front and rear portions of said molding base member for covering said recessed portions respectively, each of said end caps being provided with a protuberance protruding therefrom toward said door windowpane to cover at least partially the vertical edge of each said recessed portion, thereby keeping the vertial edge of each said recessed portion from direct contact with said door sash.

2. An automotive door side molding structure according to claim 1, wherein said protuberance of each said end cap is formed with a guide groove adapted for engagement with said horizontal edge of each said recessed portion.

3. An automotive door side molding structure according to any of claims 1 and 2, wherein said protuberance is provided with a vertical extension adapted to entirely cover, together with said protuberance, the vertical edge of each said recessed portion, and each said end cap is provided with a cover portion adapted to entirely cover, together with said protuberance, the horizontal edge of each said recessed portion.

4. An automotive door side molding structure according to claim 3, wherein said cover portion is formed with a guide groove adapted for engagement with said horizontal edge of each said recessed portion.

5. An automotive door side molding structure according to claim 1, wherein each said end cap comprises rubber or a like material.

6. An automotive door side molding structure according to claim 2, wherein each side end cap comprises rubber or a like material.

7. An automotive door side molding structure according to claim 3, wherein each said end cap comprises rubber or a like material.

8. An automotive door side molding structure according to claim 4, wherein each said end cap comprises rubber or a like material.

9. In combination, an automotive door having a door panel with a sash, a waistline and a windowpane mounted in said sash and a side molding structure, comprising:
- a molding body including a metallic molding base member provided along said waistline of said door panel, and a molding lip member of a resilient material secured along the length of said molding base member in resilient contact with said door windowpane;
- said molding body being formed with a recessed portion at each of the front and rear end portions of said metallic molding base member thereof, each said recessed portion having a horizontal edge and a vertical edge; and
- end caps fitted over said front and rear portions of said molding base member for covering said recessed portions respectively, each of said end caps being provided with a protuberance protruding therefrom toward said door windowpane to cover at least partially the vertical edge of each said recessed portion, on of said protuberances being disposed between each vertical edge of each said recessed portion and a portion of said door sash to prevent contact between said vertical edges and said door sash.

* * * * *